US009848126B2

(12) United States Patent
Kang et al.

(10) Patent No.: US 9,848,126 B2
(45) Date of Patent: *Dec. 19, 2017

(54) CAMERA MODULE

(71) Applicant: SAMSUNG ELECTRO-MECHANICS CO., LTD., Suwon-si (KR)

(72) Inventors: Byung Woo Kang, Suwon-si (KR); Oh Byoung Kwon, Suwon-si (KR); Soo Cheol Lim, Suwon-si (KR); Kwang Joon Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,566

(22) Filed: Nov. 30, 2016

(65) Prior Publication Data

US 2017/0085798 A1 Mar. 23, 2017

Related U.S. Application Data

(63) Continuation of application No. 14/658,527, filed on Mar. 16, 2015, now Pat. No. 9,578,242.

(30) Foreign Application Priority Data

Apr. 11, 2014 (KR) .................. 10-2014-0043833
May 30, 2014 (KR) .................. 10-2014-0066563
(Continued)

(51) Int. Cl.
*H04N 5/232* (2006.01)
*H04N 5/225* (2006.01)
(Continued)

(52) U.S. Cl.
CPC .......... *H04N 5/23287* (2013.01); *G02B 7/08* (2013.01); *G02B 7/09* (2013.01); *G02B 27/646* (2013.01);
(Continued)

(58) Field of Classification Search
CPC ............ H04N 5/23287; H04N 5/2257; H04N 5/2252; H04N 5/2254; G02B 7/09;
(Continued)

(56) References Cited

U.S. PATENT DOCUMENTS 5,499,143 A 3/1996 Sakamoto et al.
8,861,946 B2 10/2014 Kim et al.
(Continued)

FOREIGN PATENT DOCUMENTS

CN 1869763 A 11/2006
CN 100510844 C 11/2006
(Continued)

OTHER PUBLICATIONS

Chinese Office Action dated on Mar. 6, 2017 in corresponding Chinese patent Application No. 20150170097.5 (6 pages in Chinese; 8 pages in English).
(Continued)

*Primary Examiner* — Padma Haliyur
(74) *Attorney, Agent, or Firm* — NSIP Law

(57) ABSTRACT

A camera module including a lens unit configured to move in a direction of an optical axis and a direction perpendicular with respect to the optical axis; a housing unit accommodating the lens unit; and a shock absorbing member disposed between the housing unit and the lens unit to reduce impacts and noise generated when the housing unit and the lens unit collide.

5 Claims, 7 Drawing Sheets

(30) Foreign Application Priority Data

Aug. 8, 2014 (KR) .................. 10-2014-0102588
Oct. 16, 2014 (KR) .................. 10-2014-0139736

(51) Int. Cl.

| | | |
|---|---|---|
| *G02B 27/64* | (2006.01) | |
| *G02B 7/08* | (2006.01) | |
| *G03B 3/10* | (2006.01) | |
| *G03B 17/12* | (2006.01) | |
| *G02B 7/09* | (2006.01) | |
| *G03B 5/02* | (2006.01) | |
| *G03B 13/36* | (2006.01) | |

(52) U.S. Cl.
CPC .............. *G03B 3/10* (2013.01); *G03B 5/02* (2013.01); *G03B 13/36* (2013.01); *G03B 17/12* (2013.01); *H04N 5/2252* (2013.01); *H04N 5/2254* (2013.01); *H04N 5/2257* (2013.01); *G03B 2205/0007* (2013.01); *G03B 2205/0015* (2013.01)

(58) Field of Classification Search
CPC ........... G02B 7/08; G02B 27/646; G03B 2205/0015; G03B 2205/0007; G03B 5/02; G03B 13/36; G03B 3/10; G03B 17/12
See application file for complete search history.

(56) References Cited

U.S. PATENT DOCUMENTS

| | | |
|---|---|---|
| 2006/0269262 A1 | 11/2006 | Shin et al. |
| 2009/0060485 A1 | 3/2009 | Takahashi |
| 2009/0303594 A1 | 12/2009 | Lim et al. |
| 2010/0183288 A1 | 7/2010 | Kudoh |
| 2011/0026915 A1 | 2/2011 | Baik et al. |
| 2013/0039640 A1 | 2/2013 | Sekimoto |
| 2013/0163085 A1 | 6/2013 | Lim et al. |
| 2014/0027518 A1 | 1/2014 | Edmonds et al. |
| 2014/0043496 A1 | 2/2014 | Azuma |
| 2015/0049209 A1 | 2/2015 | Hwang et al. |

FOREIGN PATENT DOCUMENTS

| | | |
|---|---|---|
| CN | 101377603 A | 3/2009 |
| CN | 201637916 U | 11/2010 |
| CN | 103649827 A | 3/2014 |
| EP | 1 727 358 A2 | 11/2006 |
| EP | 2 840 770 A2 | 2/2015 |
| EP | 2 852 148 A2 | 3/2015 |
| JP | 2007-13661 A | 1/2007 |
| JP | 2008-304850 A | 12/2008 |
| JP | 2010-164926 A | 7/2010 |
| KR | 10-2009-0127628 A | 12/2009 |
| KR | 10-2010-0048246 A | 5/2010 |
| KR | 10-2010-0109727 A | 10/2010 |
| KR | 10-2011-0011192 A | 2/2011 |
| KR | 10-2012-0092973 A | 8/2012 |
| KR | 10-2013-0071000 A | 6/2013 |
| KR | 10-2013-0072721 A | 7/2013 |
| KR | 10-2015-0020951 A | 2/2015 |
| KR | 10-1273793 B1 | 6/2016 |

OTHER PUBLICATIONS

Chinese Office Action dated Mar. 17, 2017, in corresponding Chinese Patent Application No. 20150171253.X (6 pages in Chinese; 7 pages in English).
U.S. Final Rejection dated Jun. 24, 2015 in counterpart U.S. Appl. No. 14/311,210 (7 pages).
Korean Office Action dated Sep. 10, 2015 in counterpart Korean Patent Application No. 10-2014-0164618 (9 pages in English, 7 pages in Korean).
Korean Office Action dated Oct. 21, 2015, in counterpart Korean Application No. 10-2014-0139736 (7 pages in English, 6 pages in Korean).
Extended European Search Report dated Dec. 9, 2015, in counterpart European Application No. 15163339.5 (8 pages, in English).
Korean Office Action dated May 23, 2016 in counterpart Korean Application No. 10-2014-0139736 (5 pages in English, 4 pages in Korean).

CAMERA MODULE

CROSS-REFERENCE TO RELATED APPLICATIONS

This application is a continuation of U.S. patent application Ser. No. 14/658,527 filed on Mar. 16, 2015 which claims the priorities and benefits of Korean Patent Application Nos. 10-2014-0043833 filed on Apr. 11, 2014, 10-2014-0066563 filed on May 30, 2014, 10-2014-0102588 filed on Aug. 8, 2014, and 10-2014-0139736 filed on Oct. 16, 2014, with the Korean Intellectual Property Office, the disclosures of which are incorporated herein by reference.

BACKGROUND

The present inventive concept relates to a camera module mounted in a portable terminal.

Camera modules mounted in portable terminals commonly have an auto-focusing function. In addition, such camera modules frequently have an optical image stabilization (OIS) function for mitigating resolution degradation due to hand-shake.

The camera module having the above function may have a structure in which a lens unit may move in an optical axis direction with respect to a housing of the camera module or in a direction perpendicular thereto.

However, in such a structure, the lens unit may easily collide with the housing of the camera module due to external impacts, and thus, a structure for reducing damage or noise caused by such external impacts is required.

RELATED ART DOCUMENT

KR No. 2011-0011192 A

SUMMARY

An aspect of the present inventive concept may provide a camera module having a structure resistant to external impacts.

According to an aspect of the present inventive concept, a camera module may have a structure for eliminating or reducing collisions between a lens unit and a housing.

According to another aspect of the present inventive concept, a camera module may have a structure enabling a reduction in collisions between a lens unit and a shield can.

According to still another aspect of the present inventive concept, a camera module may have a structure enabling a reduction in collisions between a lens unit and a housing or lens holder.

BRIEF DESCRIPTION OF DRAWINGS

The above and other aspects, features and other advantages of the present inventive concept will be more clearly understood from the following detailed description taken in conjunction with the accompanying drawings, in which.

DETAILED DESCRIPTION

Figure 1:
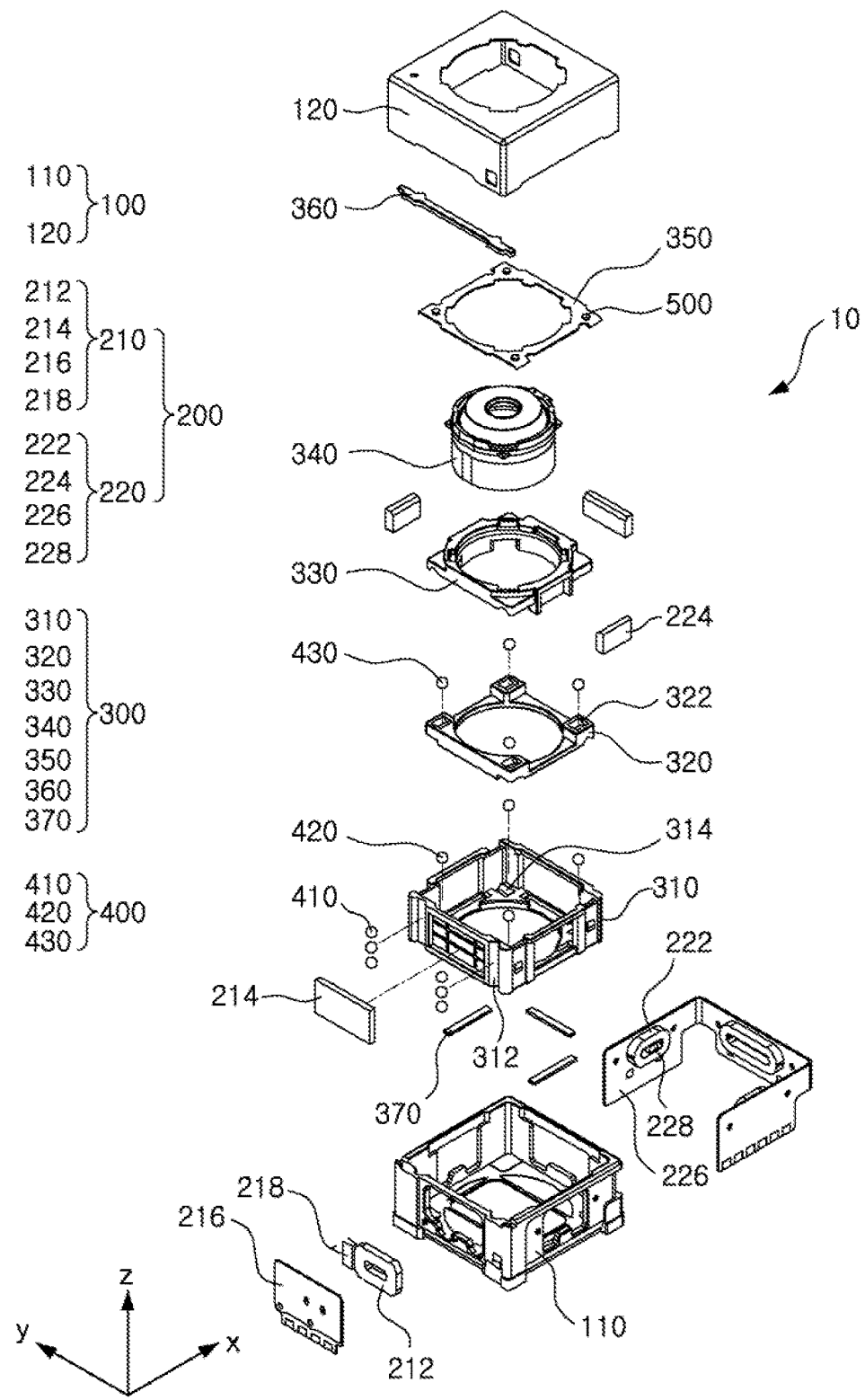
FIG. 1 is an exploded perspective view of a camera module according to an exemplary embodiment in the present inventive concept.

Exemplary embodiments of the present inventive concept will now be described in detail with reference to the accompanying drawings.

The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

In the drawings, the shapes and dimensions of elements may be exaggerated for clarity, and the same reference numerals will be used throughout to designate the same or like elements.

As used herein, in the present inventive concept, it will be further understood that the terms "include" and/or "have" when used in the present inventive concept, specify the presence of elements, but do not preclude the presence or addition of one or more other elements, unless otherwise indicated.

Referring to FIG. 1, a camera module according to an exemplary embodiment in the present inventive concept will be described.

A camera module 10 may include a housing unit 100, an actuator unit 200, and a lens unit 300. In addition, the camera module 10 may further include one or more shock absorbing members 500.

The housing unit 100 may include a housing 110 and a shield can 120.

The housing 110 may be formed of an easily moldable material. For example, the housing 110 may be manufactured of a plastic material. One or more actuator units 200 may be mounted in the housing 110. For example, a portion of a first actuator 210 may be mounted on a first side surface of the housing 110, and portions of a second actuator 220 may be mounted on second through fourth side surfaces of the housing 110, respectively. The housing 110 may be configured to accommodate the lens unit 300 therein. For example, an accommodation space for entirely or partially accommodating the lens unit 300 therein may be formed inside the housing 110. The housing 110 may have six surfaces including openings formed therein, respectively. For example, the housing 110 may have a bottom surface in which a rectangular opening for an image sensor is formed, and may have a top surface in which a square opening for mounting the lens unit 300 therein is formed. In addition, the housing 110 may have the first side surface in which an opening for inserting a first coil 212 of the first actuator 210 thereto is formed, and may have the second through fourth side surfaces in which openings for inserting second coils 222 of the second actuator 220 thereto are formed, respectively.

The shield can 120 may be configured to cover a portion of the housing 110. For example, the shield can 120 may be configured to cover the top surface of the housing 110 and the four side surfaces of the housing 110. However, a shape of the shield can 120 is not limited to a shape to cover all of the above-described portions. For example, the shield can 120 may be configured to only cover the four side surfaces of the housing 110. Alternatively, the shield can 120 may be configured to partially cover the top surface of the housing 110 and the four side surfaces of the housing 110.

The actuator unit 200 may be configured to move the lens unit 300 in one or more directions. For example, the actuator unit 200 may be configured to move the lens unit 300 in a direction of an optical axis (Z axis direction with reference to FIG. 1) and directions (X axis direction and Y axis direction with reference to FIG. 1) perpendicular with respect to the optical axis.

The actuator unit 200 may include a plurality of actuator units. As an example, the actuator unit 200 may include the first actuator 210 configured to move the lens unit 300 in the Z axis direction (with reference to FIG. 1) and the second actuator 220 configured to move the lens unit 300 in the X axis direction and the Y axis direction (with reference to FIG. 1).

The first actuator 210 may be mounted in the housing 110 and a first frame 310 of the lens unit 300. For example, a portion of the first actuator 210 may be mounted on the first side surface of the housing 110 and a remaining portion of the first actuator 210 may be mounted on a first side surface of the first frame 310. The first actuator 210 may include an element for moving the lens unit 300 in the direction of the optical axis. As an example, the first actuator 210 may include the first coil 212, a first permanent magnet 214, a first substrate 216, and a first sensor 218. The first coil 212 and the first sensor 218 may be formed on the first substrate 216. The first substrate 216 may be mounted on the first side surface of the housing 110, and the first permanent magnet 214 may be mounted on the first side surface of the first frame 310 facing the first substrate 216.

The first actuator 210 configured as above may allow relative movement of the first frame 310 and a lens barrel 340 with respect to the housing 110 by changing intensity and a direction of magnetic force generated between the first coil 212 and the first permanent magnet 214. In addition, the first actuator 210 configured as above may detect a position of the first frame 310 based on a change in a magnetic flux detected by the first sensor 218.

The second actuator 220 may be mounted in the housing 110 and a third frame 330 of the lens unit 300. For example, portions of the second actuator 220 may be mounted on the second through fourth side surfaces of the housing 110, respectively, and a remaining portion of the second actuator 220 may be mounted on second through fourth side surfaces of the third frame 330. The second actuator 220 may include an element for moving the lens unit 300 in the direction perpendicular with respect to the optical axis. As an example, the second actuator 220 may include a plurality of second coils 222, a plurality of second permanent magnets 224, a second substrate 226, and one or more second sensors 228. The plurality of second coils 222 and the one or more second sensors 228 may be formed on the second substrate 226. The second substrate 226 may be generally formed to have the shape of ⊏ and may be mounted to surround the second through fourth side surfaces of the housing 110. The plurality of second permanent magnets 224 may be mounted on the second through fourth side surfaces of the third frame 330 to face three surfaces of the second substrate 226, respectively.

The second actuator 220 configured as above may allow relative movement of the second frame 320 and the third frame 330 with respect to the first frame 310 by changing intensity and a direction of magnetic force generated between the plurality of second coils 222 and the plurality of second permanent magnets 224. For reference, the lens barrel 340 may move in the same direction as that of the second frame 320 and the third frame 330 by movement of the second frame 320 and the third frame 330. The second actuator 220 configured as above may detect positions of the second frame 320 and the third frame 330 based on a change in a magnetic flux detected by the second sensor 228.

The lens unit 300 may be mounted in the housing unit 100. For example, the lens unit 300 may be accommodated in an accommodation space formed by the housing 110 and the shield can 120 in a manner in which the lens unit 300 may move in at least three axis directions.

The lens unit 300 may be configured of a plurality of frames. For example, the lens unit 300 may include the first frame 310, the second frame 320, and the third frame 330.

The first frame 310 may be configured to move with respect to the housing 110. As an example, the first frame 310 may move in a height direction (Z axis direction with reference to FIG. 1) of the housing 110 by the first actuator 210. A plurality of guide grooves 312 and 314 may be formed in the first frame 310. As an example, the first guide grooves 312 elongatedly formed to extend in the direction of the optical axis (Z axis direction with reference to FIG. 1) may be formed in the first side surface of the first frame 310, and the second guide grooves 314 elongatedly formed to extend in a direction (Y axis direction with reference to FIG. 1) perpendicular with respect to the optical axis may be formed in four corners of an inner bottom surface of the first frame 310, respectively. The first frame 310 may be manufactured to have at least three side surfaces including openings formed therein, respectively. For example, the second through fourth side surfaces of the first frame 310 may include respective openings such that the second permanent magnets 224 of the third frame 330 exposed through the openings may face the second coils 222 of the housing 110, respectively.

The second frame 320 may be mounted in the first frame 310. For example, the second frame 320 may be mounted in an interior of the first frame 310. The second frame 320 may be configured to move in the direction perpendicular with respect to the optical axis, with respect to the first frame 310. For example, the second frame 320 may move in the direction (Y axis direction with reference to FIG. 1) perpendicular with respect to the optical axis along the second guide grooves 314 of the first frame 310. A plurality of third guide grooves 322 may be formed in the second frame 320. For example, four third guide grooves 322 elongatedly formed to extend in a direction (X axis direction with reference to FIG. 1) perpendicular with respect to the optical axis may be formed in corners of the second frame 320, respectively.

The third frame 330 may be mounted in the second frame 320. For example, the third frame 330 may be mounted on a top surface of the second frame 320. The third frame 330 may be configured to move in the direction perpendicular with respect to the optical axis, with respect to the second frame 320. For example, the third frame 330 may move in the direction (X axis direction with reference to FIG. 1) perpendicular with respect to the optical axis along the third guide grooves 322 of the second frame 320. The plurality of second permanent magnets 224 may be mounted in the third frame 330. For example, three third permanent magnets 224 may be mounted in the second through fourth side surfaces of the third frame 330, respectively.

The lens unit 300 may include the lens barrel 340. For example, the lens unit 300 may include the lens barrel 340 including one or more lenses. The lens barrel 340 may be mounted in the third frame 330. For example, the lens barrel 340 may be inserted into the third frame 330 to move integrally with the third frame 330. The lens barrel 340 may be configured to move in the direction of the optical axis and the direction perpendicular with respect to the optical axis. For example, the lens barrel 340 may move in the direction of the optical axis by the first actuator 210, and may move in the direction perpendicular with respect to the optical axis by the second actuator 220.

The lens unit 300 may further include a cover member 350, a ball stopper 360, and a magnetic body 370.

The cover member 350 may be configured to prevent the second frame 320 and the third frame 330 from escaping from the interior of the first frame 310. For example, the cover member 350 may be combined with the first frame 310 to suppress escaping of the second frame 320 and the third frame 330 upwardly of the first frame 310.

The ball stopper 360 may be mounted in the first frame 310. For example, the ball stopper 360 may be disposed to obscure the first guide grooves 312 of the first frame 310 to suppress escaping of first ball members 410 mounted in the first guide grooves 312 therefrom.

The magnetic body 370 may be mounted in the first frame 310. For example, the magnetic body 370 may be mounted in at least one of the second through fourth side surfaces of the first frame 310 to generate magnetic attractive force between the second coil 222 and the second permanent magnet 224 of the second actuator 220. The magnetic body 370 configured as above may fix positions of the second frame 320 and the third frame 330 with respect to the first frame 310 in an inactive state of the actuator unit 200. For example, the lens unit 300 may be maintained at a predetermined position inside the housing 110 by magnetic attractive force between the magnetic body 370 and the second coil 222.

The ball member 400 may be configured to smoothly move the lens unit 300. For example, the ball member 400 may be configured to smoothly move the lens unit 300 in the direction of the optical axis and the direction perpendicular with respect to the optical axis. The ball member 400 may be divided into first ball members 410, second ball members 420, and third ball members 430 based on a disposition position. As an example, the first ball members 410 may be disposed in each of the first guide grooves 312 of the first frame 310 to smoothly move the first frame 310 in the direction of the optical axis. As another example, the second ball member 420 may be disposed in each of the second guide grooves 314 of the first frame 310 to smoothly move the second frame 320 in a direction perpendicular with respect to the optical axis. As still another example, the third ball member 430 may be disposed in each of the third guide grooves 322 of the second frame 320 to smoothly move the third frame 330 in another direction perpendicular with respect to the optical axis. For reference, although not illustrated in FIG. 1, a lubricant for reducing friction and noise may be filled in all portions of the camera module 10 in which the ball member 400 is disposed. For example, a viscous fluid may be injected into each of the guide grooves 312, 314, and 322. Such a viscous fluid may use grease having excellent viscosity properties and lubrication properties.

The shock absorbing member 500 may be configured to reduce noise caused by movement of the lens unit 300. For example, the shock absorbing member 500 may be configured to reduce collision noise caused by moving the lens unit 300 in the direction of the optical axis and the direction perpendicular with respect to the optical axis due to external impacts. As an example, the shock absorbing member 500 may be formed in the cover member 350 to reduce collision noise generated between the lens unit 300 and the housing unit 100.

The shock absorbing member 500 may be manufactured of a material having a relatively high Poisson ratio. For example, the shock absorbing member 500 may be manufactured of a material having a Poisson ratio higher than 0.4. As an example, the shock absorbing member 500 may be formed of a rubber material. As another example, the shock absorbing member 500 may be formed of a liquified material capable of being gelled at a room temperature. That is, the shock absorbing member 500 may be formed of a sol state material, a gel state material, or the like.

Figure 2:
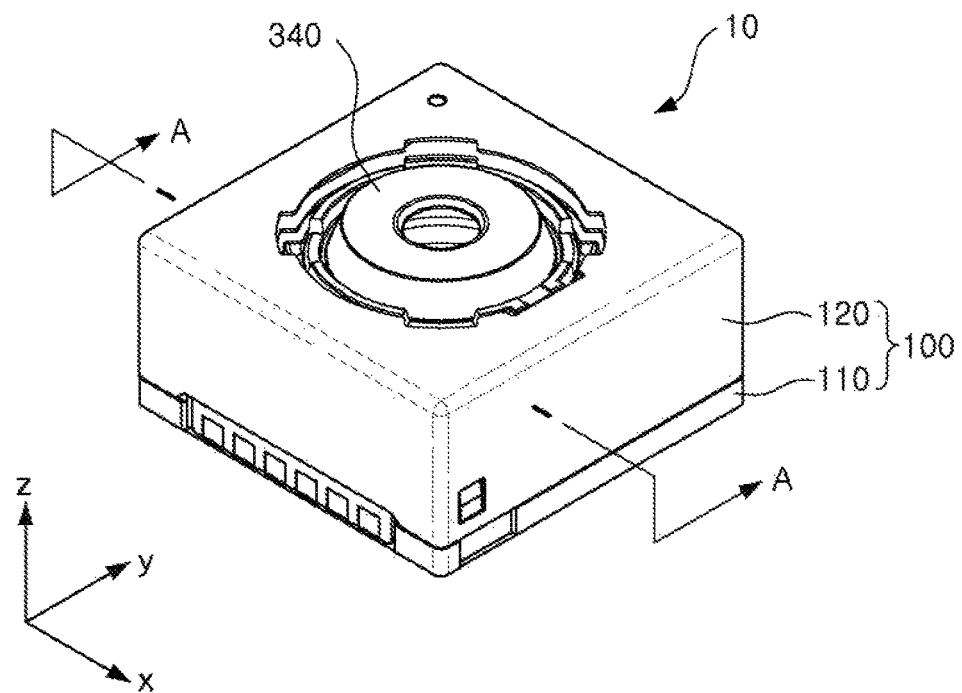
FIG. 2 is a combined perspective view of the camera module of FIG. 1.

Referring to FIG. 2, a combined form of the camera module 10 will be described.

The camera module 10 may have both an auto-focusing function and an optical image stabilization (OIS) function. For example, the lens barrel 340 may move in the direction of the optical axis and the direction perpendicular with respect to the optical axis inside the housing unit 100. Thus, the miniaturization and the slimming of the camera module 10 according to the present exemplary embodiment may be relatively easily achieved.

Figure 3:
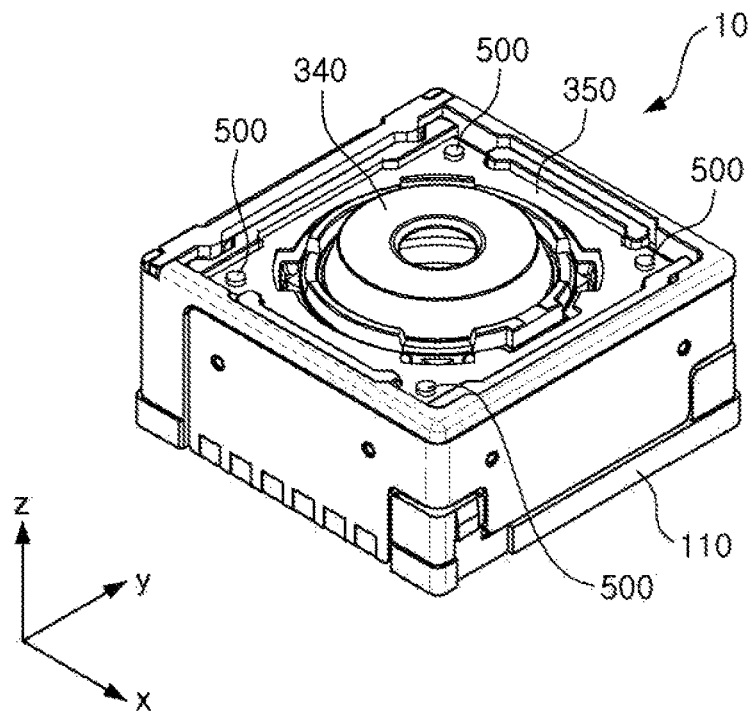
FIG. 3 is a perspective view of the camera module of FIG. 2 in a state in which a shield can is removed therefrom.

Referring to FIG. 3, the camera module 10 in a state in which the shied can 120 is removed therefrom will be described.

The camera module 10 may include one or more shock absorbing members 500. As an example, the one or more shock absorbing members 500 may be formed in the cover member 350 of the lens unit 300 as illustrated in FIG. 3. The shock absorbing members 500 formed as above may reduce noise due to vibrations of the lens barrel 340 caused by rapid movement of the lens barrel 340 or external impacts. As an example, the shock absorbing members 500 may reduce impacts and collision noise generated when the cover member 350 of the first frame 310 and the shield can 120 collide, due to vibrations of the lens barrel 340.

Figure 4:
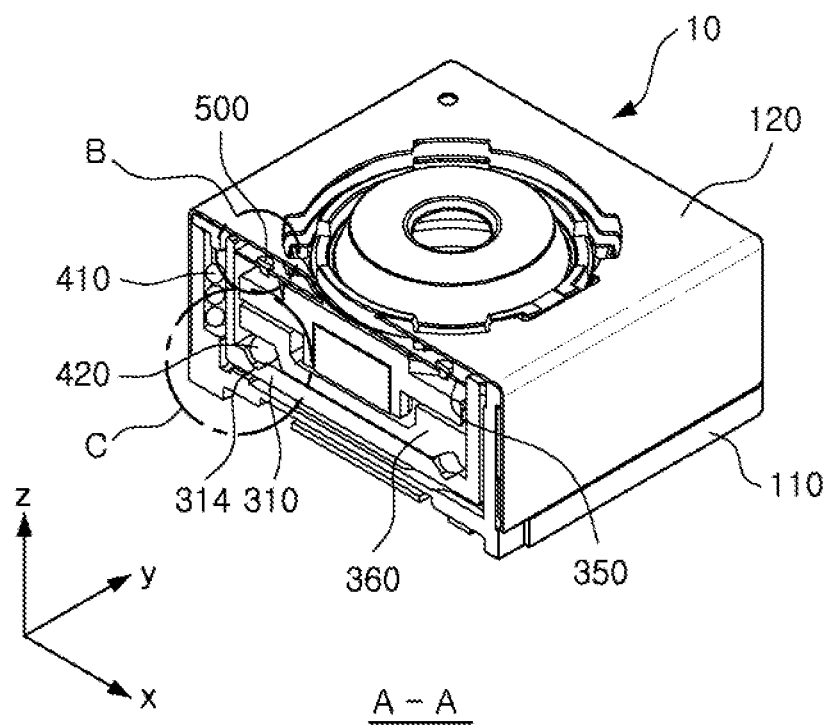
FIG. 4 is a cut perspective view of the camera module of FIG. 2 taken along line A-A.

Referring to FIG. 4, a cross-sectional structure of the camera module 10 will be described.

The camera module 10 may have the cross-sectional structure illustrated in FIG. 4. For example, the first frame 310 may be in point contact with the housing 110 by the first ball members 410, and the second frame 320 may be in point contact with the first frame 310 by the second ball members 420.

The camera module 10 configured as above may enable soft movement of the lens unit 300 due to relatively low friction resistance between the housing 110 and the first frame 310 and between the first frame 310 and the second frame 320.

In addition, the shock absorbing members 500 may be formed between the lens unit 300 and the housing unit 100, thereby reducing collisions occurring and collision noise generated between the lens unit 300 and the housing unit 100 due to external impacts.

Figure 5:
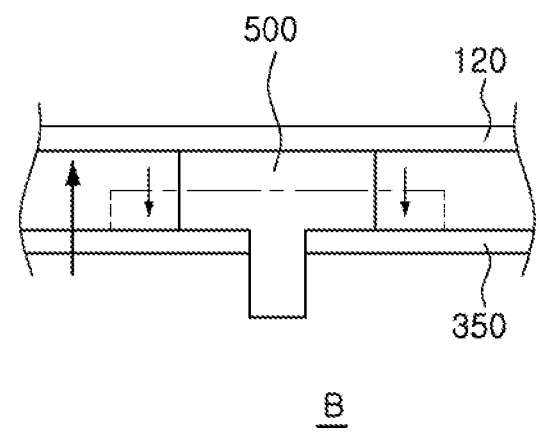
FIG. 5 is an enlarged cross-sectional view of portion B of FIG. 4, illustrating a modified state of a shock absorbing member due to external impacts.

Referring to FIG. 5, a scheme of reducing collision noise by using the shock absorbing members 500 will be described.

The shock absorbing members 500 may be configured to reduce collision energy and collision noise generated by rapid upward movement (direction with reference to FIG. 4) of the lens unit 300. For example, the shock absorbing members 500 may be disposed between the cover member 350, that is, a portion of the lens unit 300, and the shield can 120, that is, a portion of the housing unit 100, to reduce impacts and collision noise due to collisions between the cover member 350 and the shield can 120.

That is, the shock absorbing members 500 may be modified in a manner in which an area of the shock absorbing member 500 to come into contact with the cover member 350 is increased or a length of the shock absorbing member 500 is reduced when the cover member 350 and the shield can 120 collide, whereby contact time t between the cover member 350 and the shield can 120 may be increased. Such an increase in contact time t may reduce intensity of force F with respect to impact energy (W=F*t) having a predetermined magnitude, whereby collision noise as well as force F actually applied to the cover member 350 or the shield can 120 may be reduced.

Figure 6:
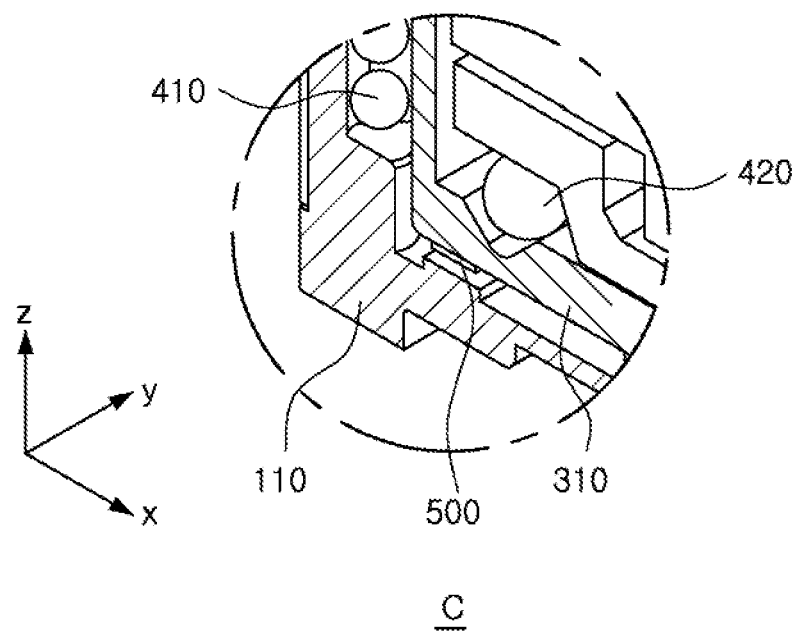
FIG. 6 is an enlarged perspective view of portion C of FIG. 4.

Referring to FIG. 6, portion C of the camera module 10 will be described.

The shock absorbing member 500 may be formed in a lower portion of the lens unit 300. For example, one or more shock absorbing members 500 may be formed between the first frame 310 of the lens unit 300 and the housing 110 of the housing unit 100.

The shock absorbing members 500 disposed as above may reduce collision energy with the housing unit 100 due to rapid downward movement (direction with reference to FIG. 6) of the lens unit 300 and may reduce collision noise generated at the time of collisions.

Figure 7:
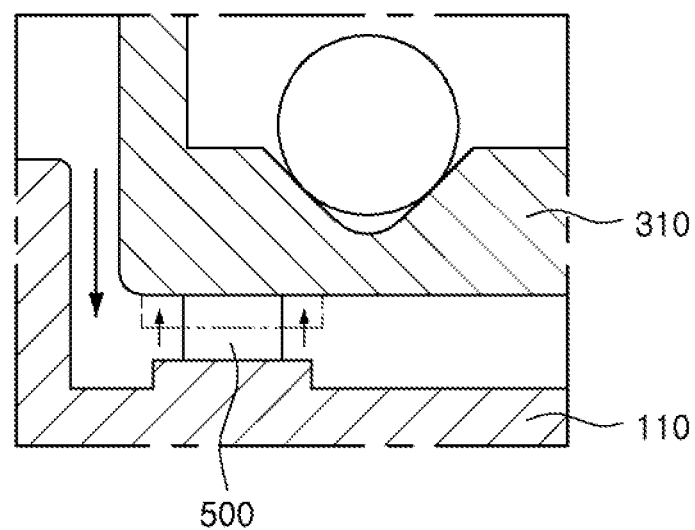
FIG. 7 is an enlarged cross-sectional view of portion C of FIG. 4, illustrating a modified state of a shock absorbing member due to external impacts.

Referring to FIG. 7, a scheme of reducing collision noise by using the shock absorbing members 500 will be described.

The shock absorbing members 500 may be configured to reduce collision energy and collision noise generated by rapid downward movement (direction with reference to FIG. 4) of the lens unit 300. For example, the shock absorbing members 500 may be disposed between the first frame 310, that is, a portion of the lens unit 300, and the housing 110, that is, a portion of the housing unit 100, to reduce impacts and collision noise generated due to collisions between the first frame 310 and the housing 110.

That is, the shock absorbing members 500 may be modified in a manner in which an area of the shock absorbing member 500 to come into contact with the first frame 310 is increased or a length of the shock absorbing member 500 is reduced when the first frame 310 and the housing 110 collide, whereby contact time t between the first frame 310 and the housing 110 may be increased. Such an increase in contact time t may reduce intensity of force F with respect to impact energy (W=F*t) having a predetermined magnitude, whereby collision noise as well as force F actually applied to the first frame 310 or the housing 110 may be reduced.

Figure 8A:
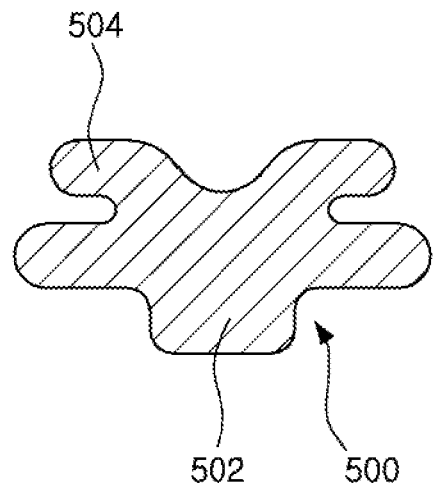
FIGS. 8A and 8B are cross-sectional views of shock absorbing members having other forms, respectively.
Figure 8B:
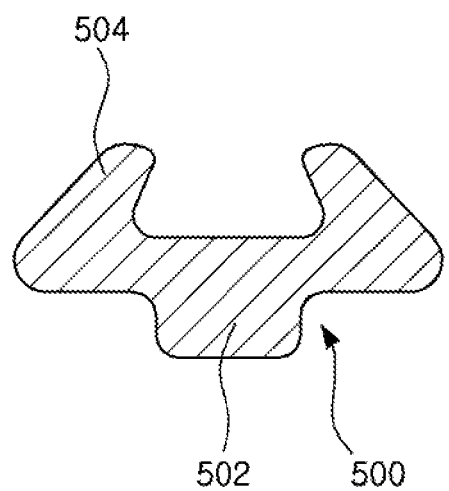

Referring to FIGS. 8A and 8B, other forms of shock absorbing members will be described.

The shock absorbing members 500 may be modified as illustrated in FIGS. 8A and 8B. For example, the shock absorbing member 500 may have a form easily elastically modifiable due to impacts.

The shock absorbing member 500 may be configured of a fixing unit 502 fixed to the lens unit 300 and a modification unit 504 to be modified by impacts. The fixing unit 502 may have a protruding shape insertable into the lens unit 300, and the modification unit 504 may be bent or compressed due to impacts.

Figure 9A:
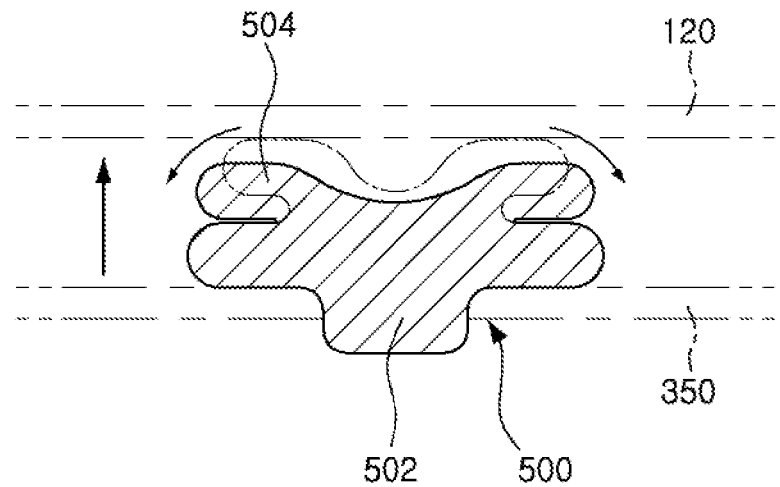
FIGS. 9A and 9B are views of modified states of the shock absorbing members of FIG. 8, respectively.
Figure 9B:
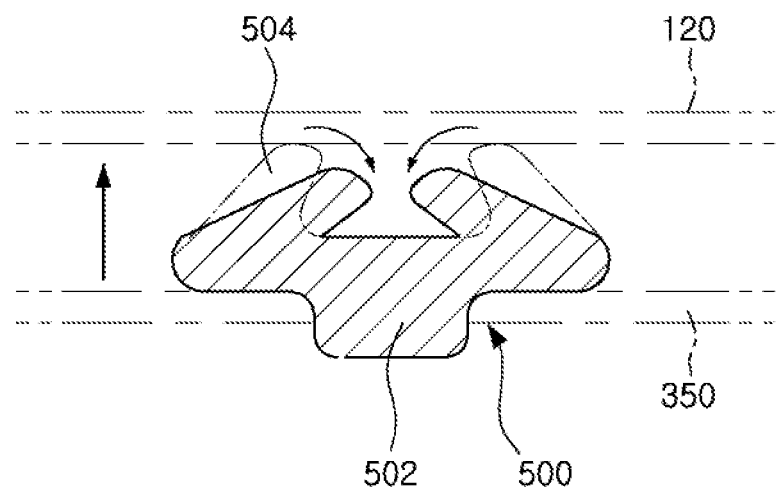

Referring to FIGS. 9A and 9B, a modified shape of the shock absorbing member 500 due to impacts will be described.

The shock absorbing member 500 of FIG. 8A may be easily compressed due to impacts. For example, the shock absorbing member 500 may be compressed due to collisions between the cover member 350 and the shield can 120 as illustrated in FIG. 9A, thereby reducing collision noise.

The shock absorbing member 500 of FIG. 8B may be easily bent due to impacts. For example, the shock absorbing member 500 may be bent due to collisions between the cover member 350 and the shield can 120 as illustrated in FIG. 9B, thereby reducing collision noise.

Figure 10:
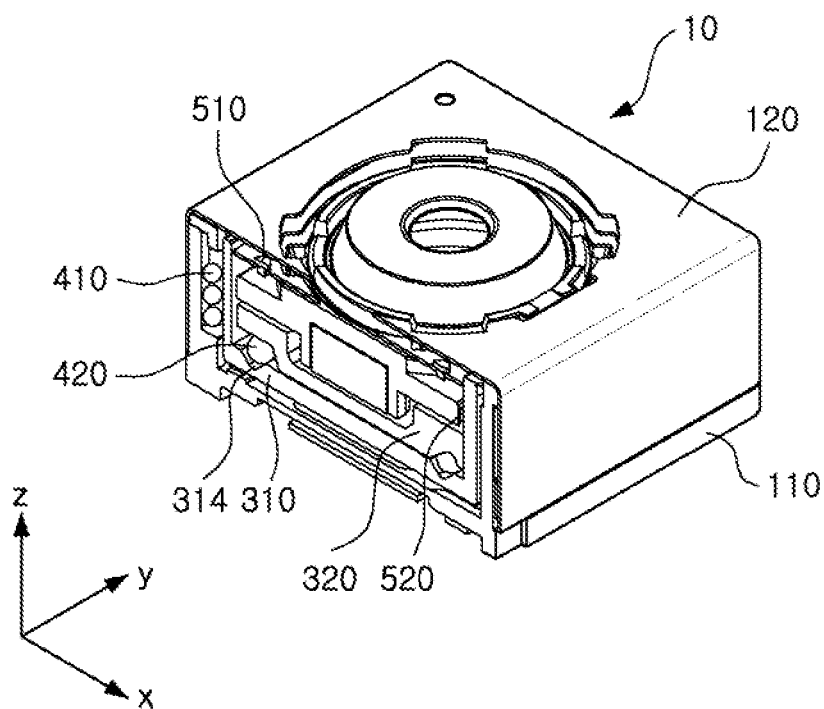
FIG. 10 is a partially cut perspective view of a camera module according to another exemplary embodiment in the present inventive concept.

Referring to FIG. 10, a camera module according to another exemplary embodiment will be described.

A camera module 10 according to another exemplary embodiment may be different from that according to the exemplary embodiment in terms of a disposition form of shock absorbing members 500. For example, the shock absorbing member 500 may include first shock absorbing members 510 for reducing collisions and collision noise generated in a direction of an optical axis and second shock absorbing members 520 for reducing collision occurring and collision noise generated in a direction perpendicular with respect to the optical axis.

The first shock absorbing members 510 may be formed in a plane (X-Y plane with reference to FIG. 10) perpendicular with respect to the optical axis in a lens unit 300. For example, the first shock absorbing members 510 may be formed in upper and lower surfaces of the lens unit 300. The first shock absorbing member 510 formed as above may reduce collisions with and collision noise generated with respect to a housing unit 100 caused by rapid movement of the lens unit 300 in the direction of the optical axis due to external impacts.

The second shock absorbing members 520 may be formed in planes (X-Z plane and Y-Z plane with reference to FIG. 10) parallel with respect to the optical axis in the lens unit 300. For example, the second shock absorbing members 520 may be formed in four side surfaces of the lens unit 300. The second shock absorbing members 520 formed as above may reduce collisions with and collision noise generated with respect to the housing unit 100 caused by rapid movement of the lens unit 300 in the direction perpendicular with respect to the optical axis due to external impacts.

Figure 11:
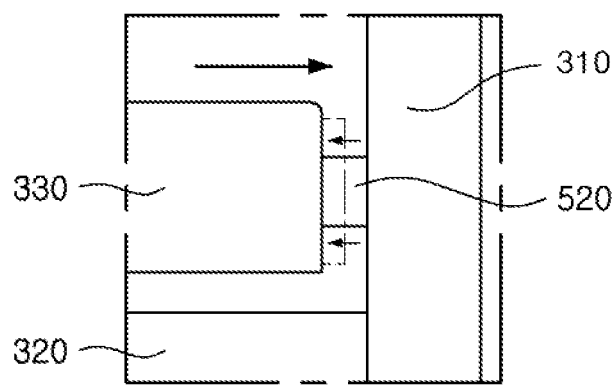
FIG. 11 is a view of a modified state of a second shock absorbing member due to external impacts.

Referring to FIG. 11, a scheme of reducing collision noise by using the second shock absorbing members 520 will be described.

The second shock absorbing members 520 may be configured to reduce collision energy and collision noise generated by rapid horizontal movement (X-Y direction with reference to FIG. 10) of the lens unit 300. For example, the second shock absorbing members 520 may be disposed between a first frame 310 a third frame 330 to reduce collision noise due to collisions between the first frame 310 and the third frame 330.

That is, the second shock absorbing member 520 may be modified in a manner in which an area of the second shock absorbing member 520 to come into contact with the third frame 330 is increased and a length of the second shock absorbing members 520 is reduced when the first frame 310 and the third frame 330 collide, whereby collision noise due to collisions between the first frame 310 and the third frame 330 may be reduced.

As set forth above, according to exemplary embodiments of the present inventive concept, damage incurred to and noise generated in a camera module due to external impacts may be reduced.

While exemplary embodiments have been illustrated and described above, it will be apparent to those skilled in the art that modifications and variations could be made without departing from the scope of the invention as defined by the appended claims.

What is claimed is:

1. A camera module comprising:
   an actuator, comprising magnets and coils configured to transfer driving force in different directions;
   a housing accommodating the actuator;
   a first frame accommodated in the housing and configured to be movable in the housing in an optical axis direction;
   a second frame and a third frame accommodated in the first frame and configured to be movable in the optical axis direction, together with the first frame;
   a lens barrel attached to the third frame;
   a cover member attached to the first frame; and
   a shock absorbing member formed in the cover member and configured to be elastically deformed,
   wherein the second frame and the third frame are configured to be movable in the first frame in a first direction perpendicular to the optical axis direction, and
   wherein the third frame is configured to be movable in the first frame in a second direction perpendicular to both the optical axis direction and the first direction.

2. The camera module of claim 1, further comprising: a yoke mounted in the first frame to allow magnetic attraction to act between the yoke and at least one magnet among the magnets in the optical axis direction.

3. The camera module of claim 1, wherein the shock absorbing member is protruded from the cover member upwardly and downwardly in the optical axis direction.

4. The camera module of claim 1, wherein the shock absorbing member comprises:
   a fixing part inserted into the cover member; and
   a modification part configured to be elastically deformed by impacts.

5. The camera module of claim 1, wherein the shock absorbing member is formed in each edge area of the cover member.

* * * * *